United States Patent
Okada et al.

(10) Patent No.: US 10,639,580 B2
(45) Date of Patent: May 5, 2020

(54) GAS CHROMATOGRAPH DEVICE INCLUDING IMPROVED HEAT TRANSFER REDUCTION TO REDUCE DETECTION ERRORS

(71) Applicant: Shimadzu Corporation, Kyoto (JP)

(72) Inventors: Masayuki Okada, Kyoto (JP); Ryuta Shibutani, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 200 days.

(21) Appl. No.: 15/923,339

(22) Filed: Mar. 16, 2018

(65) Prior Publication Data

US 2018/0264393 A1  Sep. 20, 2018

(30) Foreign Application Priority Data

Mar. 17, 2017  (JP) .................................. 2017-052017

(51) Int. Cl.
  *B01D 53/02*  (2006.01)
  *G01N 30/30*  (2006.01)
  *G01N 30/60*  (2006.01)
  *G01N 30/02*  (2006.01)

(52) U.S. Cl.
  CPC .......... *B01D 53/025* (2013.01); *G01N 30/30* (2013.01); *G01N 30/6052* (2013.01); *G01N 2030/025* (2013.01); *G01N 2030/3084* (2013.01)

(58) Field of Classification Search
  CPC .. B01D 53/025; G01N 30/30; G01N 30/6052; G01N 2030/025; G01N 2030/3084
  See application file for complete search history.

(56) References Cited

U.S. PATENT DOCUMENTS

| 8,075,768 B1* | 12/2011 | Okado | G01N 30/30 |
|---|---|---|---|
| | | | 210/143 |
| 2015/0260694 A1* | 9/2015 | Matsuoka | G01N 30/30 |
| | | | 73/23.41 |
| 2015/0268201 A1* | 9/2015 | Kanai | G01N 30/54 |
| | | | 73/23.39 |

FOREIGN PATENT DOCUMENTS

| CN | 1598569 A | 3/2005 |
|---|---|---|
| CN | 101995443 A | 3/2011 |
| JP | 7-18850 B2 | 7/1987 |

OTHER PUBLICATIONS

Chinese Office Action dated Jan. 15, 2020, in connection with corresponding CN Application No. 201810204907.8 (13 pgs., including machine-generated English translation).

* cited by examiner

*Primary Examiner* — Lisa M Caputo
*Assistant Examiner* — Nigel H Plumb
(74) *Attorney, Agent, or Firm* — Maier & Maier, PLLC

(57) ABSTRACT

A gas chromatograph in which the effect of the heat from a column oven on the detection sensitivity of a detector is reduced. The gas chromatograph includes a separation column, a column oven, a heat insulating material covering the outer surface of the column oven, a sheet metal covering the outside of the heat insulating material, a detector including a detection unit disposed outside the sheet metal, a flow path part of the detector communicating with the detection unit and being connected to the separation column through upper surfaces of the sheet metal, the heat insulating material, and the column oven, and an outside seal member interposed between the sheet metal and the heat insulating material on at least the upper surface side of the column oven and blocking an outward fluid movement from an inside of the sheet metal.

6 Claims, 2 Drawing Sheets

Figure 1:
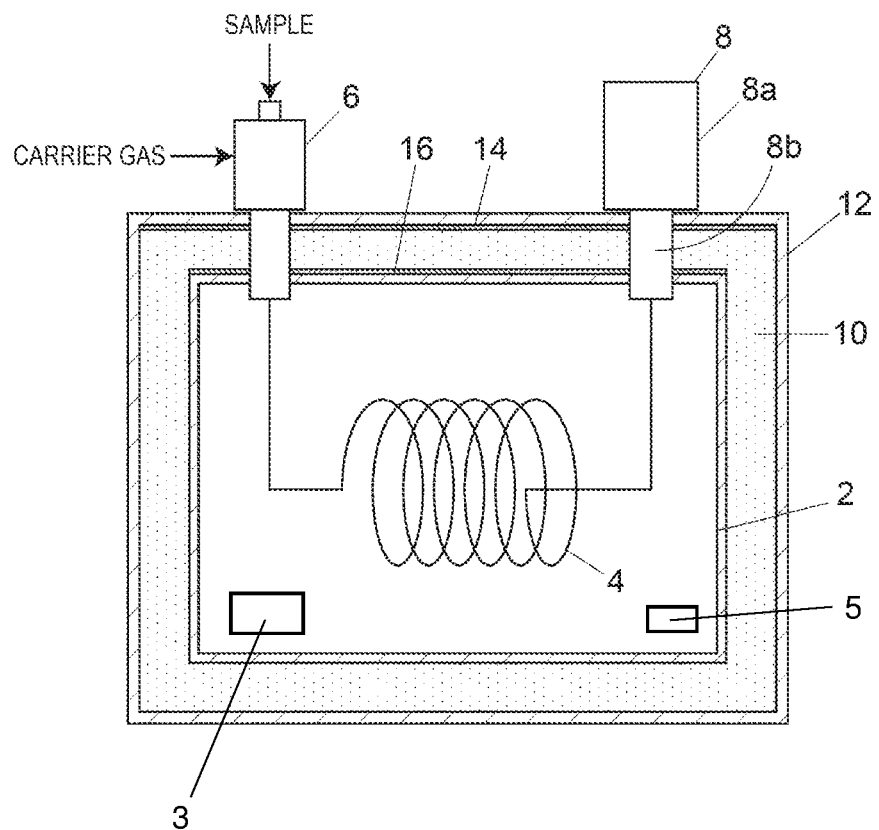

GAS CHROMATOGRAPH DEVICE INCLUDING IMPROVED HEAT TRANSFER REDUCTION TO REDUCE DETECTION ERRORS

FIELD

The present invention relates to a gas chromatograph vaporizing a sample, separating the sample by component by guiding the sample to a separation column, and then detecting each separated sample component by using a detector.

BACKGROUND

A gas chromatograph is configured such that a sample vaporization portion is connected to one end of a separation column and a detector is connected to the other end of the separation column. The sample vaporization portion is to allow a sample gas obtained by an injected sample being vaporized to be introduced into the separation column by a carrier gas. The sample gas introduced into the separation column is temporally separated by component and each sample component is detected by the detector.

Temperature control is performed with the separation column accommodated in a column oven. The sample vaporization portion and the detector are attached to the upper surface of the column oven or the like and integrated with the column oven. The column oven is covered with a heat insulating material, and the inside and the outside of the column oven are thermally blocked from each other (see, for example, Patent Literature 1).

The detection sensitivity of the detector has a high level of temperature dependence as well, and the detection sensitivity is disturbed and the reproducibility of an analysis result is deteriorated once the temperature of the detector fluctuates. Accordingly, a detection unit of the detector performing the sample component detection is disposed outside the column oven and temperature control on the detection unit is performed independently of the column oven.

[Patent Literature 1] JP-B-7-18850

SUMMARY

In the gas chromatograph, the inside and the outside of the column oven are thermally blocked from each other by the column oven being covered with the heat insulating material and the detection unit of the detector is disposed outside the heat insulating material as described above so that the detector is not affected by the heat in the column oven. Although this structure has caused no particular problem in measurement ranges so far, it has been found that further detector sensitivity improvement leads to the detection signal of the detector drifting to the point of being problematic by being affected by the heat in the column oven.

Although the column oven is covered with the heat insulating material and the heat insulating material is surrounded by a sheet metal, the sheet metal surrounding the heat insulating material is not completely airtight. In the sheet metal, a gap through which the gas therein leaks out is present at, for example, a joint of the sheet metal. Moreover, in a case where the column oven has a hole for additional part attachment, the number of such gaps through which the gas therein leaks out increases.

Even when such gaps are present in the sheet metal surrounding the heat insulating material, the heat from the column oven is unlikely to affect the detection sensitivity by reaching the detection unit of the detector disposed outside the heat insulating material since the column oven is covered with the heat insulating material. In actuality, however, it has been known that a drifting detection signal is caused by the detection sensitivity of the detector being affected by the heat from the column oven.

An object of the present invention is to reduce the effect of the heat of a column oven on a detector.

The present inventors have found that the above problem is because the material of the heat insulating material thermally blocking the inside and the outside of the column oven from each other is a breathable and wool-shaped material, and thus the gas leaking out from the column oven and the gas receiving the heat from the column oven leak out from the gap in the sheet metal outside the heat insulating material through the inner portion of the heat insulating material. The present invention has been made based on such knowledge.

A gas chromatograph according to the present invention includes a separation column, a column oven accommodating the separation column in the column oven and configured to adjust a temperature of the separation column, a heat insulating material covering an outer surface of the column oven, a sheet metal covering an outside of the heat insulating material, a detector including a detection unit disposed outside the sheet metal, a flow path part of the detector communicating with the detection unit and being connected to the separation column through upper surfaces of the sheet metal, the heat insulating material, and the column oven, and an outside seal member interposed between the sheet metal and the heat insulating material on at least the upper surface side of the column oven and blocking an outward fluid movement from an inside of the sheet metal. Heat from the column oven leaking out from the upper surface side of the sheet metal surrounding the outside of the heat insulating material is suppressed by the presence of the outside seal member.

A preferred embodiment of the present invention further includes an inside seal member interposed between the column oven and the heat insulating material and blocking an outward fluid movement from an inside of a housing. A high-temperature gas leaking out from the column oven is suppressed by the inside seal member being disposed, and thus the heat of the column oven becomes less likely to reach the detection unit of the detector and the effect of the heat in the column oven on the detector is further reduced. Moreover, the accuracy of column oven temperature control is improved as an outflow of heat from the column oven is suppressed.

Preferably, the outside seal member is a thin film-shaped member. The thin film-shaped member is easily processed, and thus is easily handled. Accordingly, the outside seal member can be realized inexpensively.

Examples of the thin film-shaped member include an aluminum sheet and a stainless steel sheet.

In the gas chromatograph according to the present invention, the outside seal member blocking an outward fluid movement from the inside of the sheet metal is disposed between the sheet metal and the heat insulating material on at least the upper surface side of the column oven. Accordingly, a high-temperature gas receiving heat from the column oven reaching the detection unit of the detector disposed on the upper surface side of the column oven is suppressed and the effect of the heat of the column oven on the detector is reduced. As a result, a drifting detection signal attributable to the effect of the heat in the column oven can be suppressed even when the sensitivity of the detector is improved.

Figure 2:
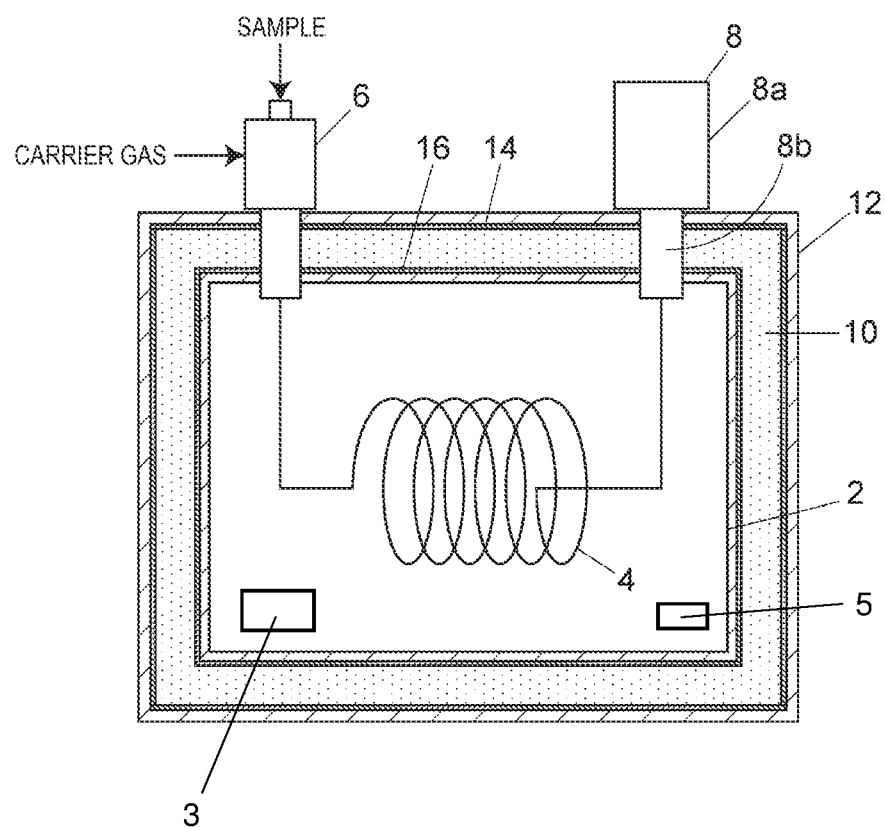

FIG. 1 is a schematic sectional configuration diagram illustrating an example of a gas chromatograph; and FIG. 2 is a schematic sectional configuration diagram illustrating another example of the gas chromatograph.

DETAILED DESCRIPTION

Hereinafter, an example of a gas chromatograph will be described with reference to accompanying drawings.

In the gas chromatograph, a separation column 4 is accommodated in a column oven 2, a sample vaporization portion 6 is connected to one end of the separation column 4, and a detector 8 is connected to the other end of the separation column 4. The column oven 2 is provided with a heater 3 (schematically illustrated) and a temperature sensor 5 (schematically illustrated), and the column oven 2 is configured such that the internal temperature of the column oven 2 reaches a set temperature by being adjusted.

A heat insulating material 10 formed of glass wool, ceramic wool, rock wool, a gypsum board or the like is disposed around the column oven 2. In other words, the outer peripheral surface of the column oven 2 is surrounded by the heat insulating material 10 and the inside and the outside of the column oven 2 are thermally blocked from each other.

The outer peripheral surface of the heat insulating material 10 surrounding the column oven 2 is covered by a sheet metal 12 formed of steel, stainless steel, aluminum, or the like. The sample vaporization portion 6 and the detector 8 are attached to the sheet metal 12 on the upper surface side of the column oven 2. Each of the sample vaporization portion 6 and the detector 8 is connected to the separation column 4 in the column oven 2 through the top plates of the sheet metal 12, the heat insulating material 10, and the column oven 2.

In the gas chromatograph, a sample injected into the sample vaporization portion 6 is vaporized into a sample gas in the sample vaporization portion 6 and transported to the separation column 4 by a carrier gas supplied into the sample vaporization portion 6. The sample gas is temporarily separated by component in the separation column 4 and detected after being guided to a detection unit 8a of the detector 8.

The detection sensitivity of the detector 8 has temperature dependence, and thus the detection unit 8a is disposed outside the sheet metal 12 and temperature adjustment on the detection unit 8a is performed independently of the column oven 2 such that the temperature of the detection unit 8a of the detector 8 does not fluctuate by being affected by heat from the column oven 2. A flow path portion 8b of the detector 8 is inserted to the inside of the sheet metal 12, and a flow path communicating with the detection unit 8a is provided in the flow path portion 8b.

A thin film-shaped seal member 14 (outside seal member) is disposed between the heat insulating material 10 and the sheet metal 12 on the upper surface side of the column oven 2. The seal member 14 prevents the gas inside the sheet metal 12 from leaking out to the upper surface side of the sheet metal 12, that is, the detection unit 8a side of the detector 8 by sealing gaps present in the sheet metal 12 disposed on the upper surface side of the column oven 2. An aluminum sheet, a stainless steel sheet, or the like can be used as the seal member 14.

The "gaps" present in the sheet metal 12 are, for example, the gaps of holes that are formed in the sheet metal 12 so that the sample vaporization portion 6 and the detector 8 pass through the sheet metal 12 and the gap at a joining part of the plate material which constitutes the sheet metal 12. In a case where a hole for additional part attachment is formed in the sheet metal 12, the hole also corresponds to the "gap". When the "gaps" are present, the high-temperature gas leaking out from the column oven 2 and the gas receiving the heat from the column oven 2 leak out to the detection unit 8a side of the detector 8. In this example, the "gaps" are sealed by the seal member 14, and thus the heat of the column oven 2 is unlikely to reach the detection unit 8a of the detector 8.

Likewise, in this example, a seal member 16 (inside seal member) is disposed between the upper surface of the column oven 2 and the heat insulating material 10. The seal member 16 blocks an outward gas movement from the inner portion of the column oven 2 by sealing the gap in a housing of the column oven 2. An aluminum sheet and a stainless steel sheet can be used as the seal member 16 as is the case with the seal member 14.

In a case where the seal member 16 is not disposed, the high-temperature gas leaking out from the column oven 2 is capable of reaching the flow path portion 8b of the detector 8 through the heat insulating material 10. Since the seal member 14 is disposed between the heat insulating material 10 and the sheet metal 12 on the upper surface side of the column oven 2, the high-temperature gas from the column oven 2 does not leak out to the upper surface side of the sheet metal 12 where the detection unit 8a of the detector 8 is disposed, owing to the presence of the seal member 14, even when the high-temperature gas flows out from the column oven 2. Still, the high-temperature gas flows through the heat insulating material 10 and reaches the flow path portion 8b of the detector 8 inserted to the inside of the sheet metal 12, and then the heat of the column oven 2 is transferred to the detection unit 8a via the flow path portion 8b to affect the detection sensitivity.

In this example, the seal member 16 is disposed, on the upper surface side of the column oven 2 where the detection unit 8a of the detector 8 is disposed, so that no high-temperature gas leaks out from the inner portion of the column oven 2. As a result, the high-temperature gas in the column oven 2 is unlikely to reach the flow path portion 8b of the detector 8 and the effect of the heat in the column oven 2 on the detector 8 is further reduced.

In the example described above, the seal members 14 and 16 are disposed only on the upper surface side of the column oven 2. However, the present invention is not limited thereto. Alternatively, the seal members 14 and 16 may be disposed to surround the column oven 2 as illustrated in FIG. 2. In addition, either one of the seal members 14 and 16 may be disposed only on the upper surface side of the column oven 2 with the other seal member disposed to surround the column oven 2 as illustrated in FIG. 2. When the seal member 16 between the column oven 2 and the heat insulating material 10 is disposed to surround the column oven 2, in particular, heat leak from the column oven 2 can be significantly reduced, and thus the effect of the heat of the column oven 2 on the detector 8 can be further reduced. The internal temperature of the column oven 2 is controlled with improved accuracy when the heat leak from the column oven 2 is reduced.

The invention claimed is:
1. A gas chromatograph comprising:
a separation column;

a column oven accommodating the separation column in the column oven and configured to adjust a temperature of the separation column using a heater and a temperature sensor;

a heat insulating material covering an outer surface of the column oven;

a sheet metal covering an outside of the heat insulating material;

a detector including a detection unit disposed outside the sheet metal, and a flow path part communicating with the detection unit, the flow path part passing through holes provided in upper surfaces of the sheet metal, the heat insulating material, and the column oven and being connected to the separation column; and an outside seal member interposed between the sheet metal and the heat insulating material on at least the upper surface side of the column oven and blocking an outward fluid movement from an inside of the sheet metal.

2. The gas chromatograph according to claim 1, further comprising an inside seal member interposed between the column oven and the heat insulating material and blocking an outward fluid movement from an inside of a housing.

3. The gas chromatograph according to claim 2, wherein the inside seal member is a thin film-shaped member.

4. The gas chromatograph according to claim 3, wherein the inside seal member is an aluminum sheet or a stainless steel sheet.

5. The gas chromatograph according to claim 1, wherein the outside seal member is a thin film-shaped member.

6. The gas chromatograph according to claim 5, wherein the outside seal member is an aluminum sheet or a stainless steel sheet.

* * * * *